Jan. 12, 1937.  G. NANOS ET AL  2,067,540

ROTARY SEAL FOR COMPRESSORS AND THE LIKE

Filed April 13, 1936

INVENTORS
GEORGE NANOS
RICHARD R. BLYTHE
BY
ATTORNEY

Patented Jan. 12, 1937

2,067,540

UNITED STATES PATENT OFFICE 2,067,540

ROTARY SEAL FOR COMPRESSORS AND THE LIKE

George Nanos and Richard R. Blythe, New York, N. Y.; said Nanos assignor to said Blythe Application April 13, 1936, Serial No. 74,006

3 Claims. (Cl. 286—7)

This invention relates to means of sealing the rotating shafts of pumps, compressors and the like against leakage.

The principal object of the invention is to provide a rotary seal which will act immediately on placement in the unit and will continue to hold pressure even under long wear.

One of the troubles with rotary seals as made in standard practice is that they require a run in period before they seat themselves perfectly enough to hold the pressure. Another defect is that after long wear the parts are so constructed that the wearing surfaces cut, the harder into the softer, and leave a burr or chip at the edge which impairs its proper function. Another serious difficulty arises from the fact that in installing the standard seal now used in a compressor the workman in the factory or the repairman is not careful or accurate enough in his work to assure absolute alignment of the parts and binding of the contact elements increases the "wear-in" time.

The design disclosed in the accompanying drawing provides self-aligning features which permit the parts to act immediately and to produce a perfect sealing action after a very short run or operation. This feature also greatly increases the life of the seal.

The details of construction which accomplish these ends are better disclosed by reference to the drawing, in which, Fig. 1 is a vertical section taken thru the end of a compressor along the center line of the shaft, and bearing to be sealed.

Similar reference numerals refer to similar parts thruout the drawing.

Figure 1:
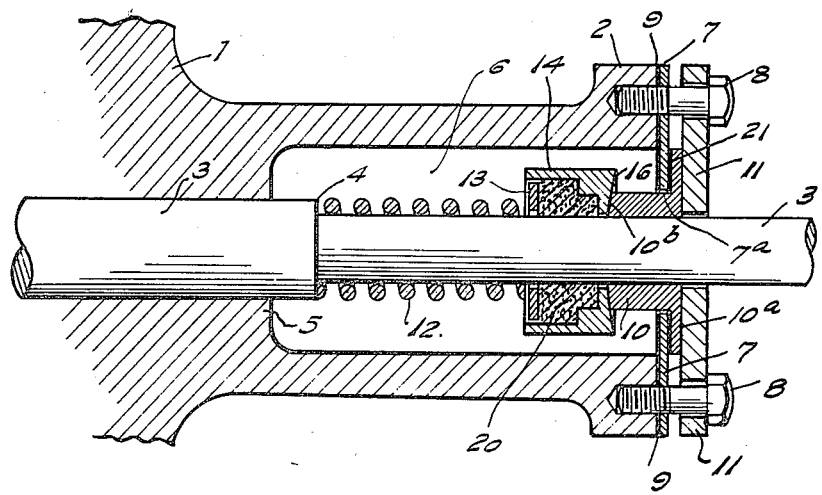

A compressor frame 1 has an extended flange housing 2 thru which the shaft 3 projects. The shaft 3 passes thru bearing 5 in the housing and is then preferably reduced to form the shoulder 4. The housing 2 has a cavity 6 into which the seal parts are assembled. The cavity 6 is closed by a relatively thin plate 7 which is held in place by bolts 8 and sealed by gasket 9. This plate 7 has a hole 7a thru which a relatively soft bushing 10 extends. This bushing has a flange 10a and a convex face 10b. A relatively heavy plate 11, held also by bolts 8 forces against the flange 10a of the bushing 10 and holds it tightly in place against plate 7. Between the flange 10a of bushing 10 and the plate 7 is inserted a gasket seal 21. Inside of the housing 2 a spring 12 is slipped over the shaft 3 and one end rests against shoulder 4, whereas the other end presses against washer 13 which in turn forces plastic packing 20 into the recess in cup 14 and also presses the face 16 of cup 14 against coacting face 10b of the bushing. The cup 14 is bored out to fit over the shaft at 15 and counterbored to form cavity walls 17 and 18, this produces sharp edge 19. When the plastic packing 20 is forced into position by the washer 13 it swells against the shaft 3 and against edge 19 to form an immediate seal at this point. The cup 14 has a concave face 16 which is highly polished and runs against the bushing face 10b which is also highly polished. When the shaft of the compressor is rotated the spring 12, washer 13, plastic packing 20, and the cup 14 all rotate with it; whereas bushing 10, gasket 21, plate 7, gasket 9, and bolts 8 all remain stationary with the housing 2.

Figures 2, 3, 4:
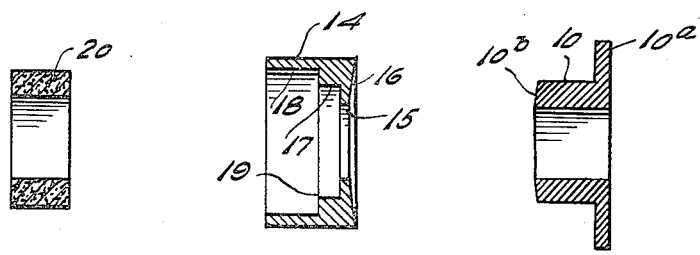
Fig. 2 is a vertical section of the cup part of the seal.
Fig. 3 is a vertical section of the bushing which bears against the cup and forms the seal.
Fig. 4 is a vertical section of the washer which seals the cup to the shaft.

The faces of cup 14 and bushing 10 coact to form the rotary seal. The face 16 of the cup 14 is shown in its preferred form in Fig. 2; likewise the coacting face 10b of the bushing 10 is shown in Fig. 3. The diameter of face 16 of the hardened bushing is preferably larger than the diameter of the face 10b of the soft bushing 10. The purpose of this is to have the harder surface which will wear the least cut or wear away the full face of the softer bushing and leave no edge with its attendant chips and overhang. Obviously the cup and bushing can be reversed as to hardness or material, but in any instance the harder must be the larger to maintain this same condition of wear.

When the seal is installed in the compressor the mechanic has no difficulty in aligning the two sealing elements as the bushing 10 and the face 16 of the cup take a definite seat against each other, the one permitting the other to align, as the bolts 8 are pulled up tight.

Having described the invention what is claimed as new and is desired to be secured by Letters Patent is:—

1. Means for sealing a shaft passing through the wall of a housing, comprising a cup having a shouldered recess surrounding said shaft, a packing of plastic material seated in said cup, means to force said packing into said cup having sufficient strength to distort said packing beyond said shoulder for frictionally retaining said cup on said shaft and forming a seal therebetween, a concave sealing face on the end of the cup, a complementary seal element having a seal face disposed around said shaft, and shiftable laterally with respect thereto, and means for securing the seal element to the housing including an apertured disc, said seal element and disc being constructed and arranged to provide for adjustment of said seal element to secure mating contact between said seal faces.

2. Means for sealing a shaft passing through the wall of a housing, comprising a cup having a recess surrounding said shaft, a packing of plastic material seated in said recess, means to force said packing into said cup having sufficient strength to distort said packing for frictionally retaining said cup on said shaft and forming a seal therebetween, a concave sealing face on the end of the cup, a complementary seal element having a seal face disposed around said shaft and shiftable laterally with respect thereto and secured to said housing by an apertured disc, said seal element and disc being constructed and arranged to provide for adjustment of said seal element to secure mating contact between said seal faces, and a backing plate to force the seal element against the apertured disc.

3. Means for sealing a shaft passing through the wall of a housing, comprising a cup having a recess surrounding said shaft, a packing of plastic material seated in said recess, means to force said packing into said cup, having sufficient strength to distort said packing, for frictionally retaining said cup on said shaft and forming a seal therebetween, a sealing face on the end of the cup, a complementary seal element having a seal face disposed around said shaft, and shiftable laterally with respect thereto and secured to said housing by an apertured disc, said seal element and disc being constructed and arranged to provide for adjustment of said seal element to secure mating contact between said seal faces, and a backing plate to force the seal element against the apertured disc.

GEORGE NANOS.
RICHARD R. BLYTHE.